US012740626B1

(12) United States Patent
Parete

(10) Patent No.: US 12,740,626 B1
(45) Date of Patent: Sep. 22, 2026

(54) SMARTPHONE SECURE STORAGE DEVICE

(71) Applicant: Guido Parete, Bolton (CA)

(72) Inventor: Guido Parete, Bolton (CA)

( * ) Notice: Subject to any disclaimer, the term of this patent is extended or adjusted under 35 U.S.C. 154(b) by 0 days.

(21) Appl. No.: 19/185,475

(22) Filed: Apr. 22, 2025

(51) Int. Cl.
*A45C 11/00* (2006.01)
*A45C 13/00* (2006.01)
*G06F 21/32* (2013.01)
*H02J 50/00* (2016.01)
*H05K 5/02* (2006.01)

(52) U.S. Cl.
CPC .......... *A45C 11/002* (2025.01); *A45C 13/005* (2013.01); *G06F 21/32* (2013.01); *H02J 50/005* (2020.01); *H05K 5/0208* (2013.01); *H05K 5/0221* (2013.01); *H05K 5/0226* (2013.01); *H02J 2207/30* (2020.01)

(58) Field of Classification Search
CPC ..... A45C 11/002; A45C 13/005; G06F 21/32; H02J 50/005; H02J 2207/30; H05K 5/0208; H05K 5/0221; H05K 5/0226
See application file for complete search history.

(56) References Cited

U.S. PATENT DOCUMENTS 5,501,050 A 3/1996 Ruel
5,531,082 A * 7/1996 Wolk .................... A45C 13/20 70/312
6,192,719 B1 * 2/2001 Stukas ............... E05B 73/0011 70/30
7,891,220 B2 2/2011 Yen
D692,013 S 10/2013 Crysell
9,032,766 B2 5/2015 Su
9,316,026 B2 4/2016 Myers
9,369,168 B2 6/2016 Molnar
9,410,344 B2 * 8/2016 Stacey ............... E05B 73/0082
9,866,255 B1 1/2018 Ketter-Muldrow
10,794,092 B2 * 10/2020 Yu .......................... E05G 1/026
11,038,359 B2 * 6/2021 Alfred ................ H01M 50/256
2004/0045329 A1 * 3/2004 Farnham ............ E05B 73/0005 70/161
2007/0180873 A1 * 8/2007 Yen ..................... A45C 11/001 70/63
2021/0098999 A1 * 4/2021 Cipolla, Jr. .............. H02J 7/32
2021/0138965 A1 * 5/2021 Ugrin ..................... A63G 31/00
2022/0094182 A1 * 3/2022 Fowler ............... B60R 11/0241

FOREIGN PATENT DOCUMENTS

KR 20190078423 A * 7/2019 ............ A45C 11/00
WO WO2012173764 12/2012

* cited by examiner

*Primary Examiner* — Nay Tun

(57) ABSTRACT

A smartphone secure storage device for securing a smartphone includes a block has a recess extending into the block to contain a smartphone. A lid is hingedly coupled to the block to secure the smartphone in the recess. A wireless charger is integrated into recess in the block for charging the smartphone. A hoop is coupled to and extends upwardly from the block. A biometric scanner is integrated into the lid which can be touched by a finger of the user. A locking mechanism is integrated into the lid which extends through the hoop to inhibit the lid from being opened. The locking mechanism is unlocked when the user touches the biometric scanner. A cable is slidably integrated into the lid and the cable can be extended around a stationary object to secure the block and the lid to the stationary object.

18 Claims, 6 Drawing Sheets

16
26
46
28
48
38
36
50
40
52
32
70
14
18
62
68
66
64
72
20
12
60
22
24
42
44
34

SMARTPHONE SECURE STORAGE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to smartphone storage device and more particularly pertains to a new smartphone storage device for securely storing a smartphone. The device includes a block with a recess for insertably receiving a smartphone and a lid hingedly attached to the block to secure the smartphone in the recess. The device includes a wireless charger integrated into the block to charge the smartphone and a biometric scanner for unlocking the lid to access the smartphone. The device includes a cable that is extendable outwardly from the lid which can be extended around a stationary object and removably attached to the block to secure the block and the lid to the stationary object.

(2) Description of Related Art Including Information Disclosed Under 37 CFR 1.97 and 1.98

The prior art relates to smartphone storage devices including: a variety of lockable container devices that each at least includes a cable that is extendable around a stationary object and a combination lock for unlocking the cable; a security case device for a portable electronic device which includes a spool rotatably integrated into a storage case and a cable which is wrapped around the spool that can be secured to a stationary object. In no instance does the prior art disclose a smartphone secure storage device that includes a block which has a recess to insertably receive a smartphone and a lid hingedly coupled to the block for securing the smartphone and a wireless charger integrated into the block to charge the smartphone and a cable that is extendable around a stationary device to secure the block and the lid and a biometric scanner integrated into the lid for locking or unlocking the cable and the lid.

BRIEF SUMMARY OF THE INVENTION

An embodiment of the disclosure meets the needs presented above by generally comprising a block has a recess extending into the block to contain a smartphone. A lid is hingedly coupled to the block to secure the smartphone in the recess. A wireless charger is integrated into recess in the block for charging the smartphone. A hoop is coupled to and extends upwardly from the block. A biometric scanner is integrated into the lid which can be touched by a finger of the user. A locking mechanism is integrated into the lid which extends through the hoop to inhibit the lid from being opened. The locking mechanism is unlocked when the user touches the biometric scanner. A cable is slidably integrated into the lid and the cable can be extended around a stationary object to secure the block and the lid to the stationary object.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
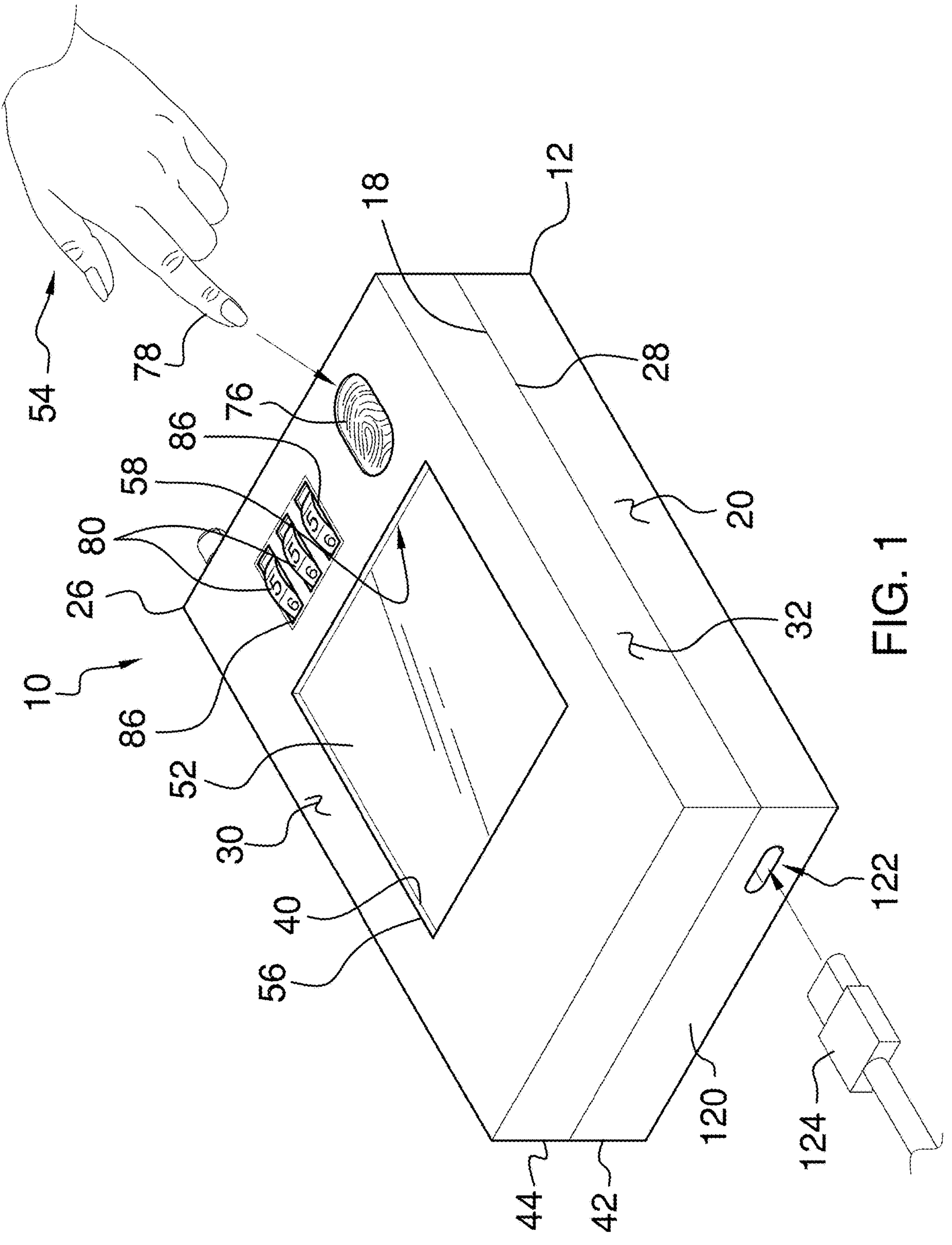
FIG. 1 is a top perspective view of a smartphone secure storage device according to an embodiment of the disclosure.
Figure 2:
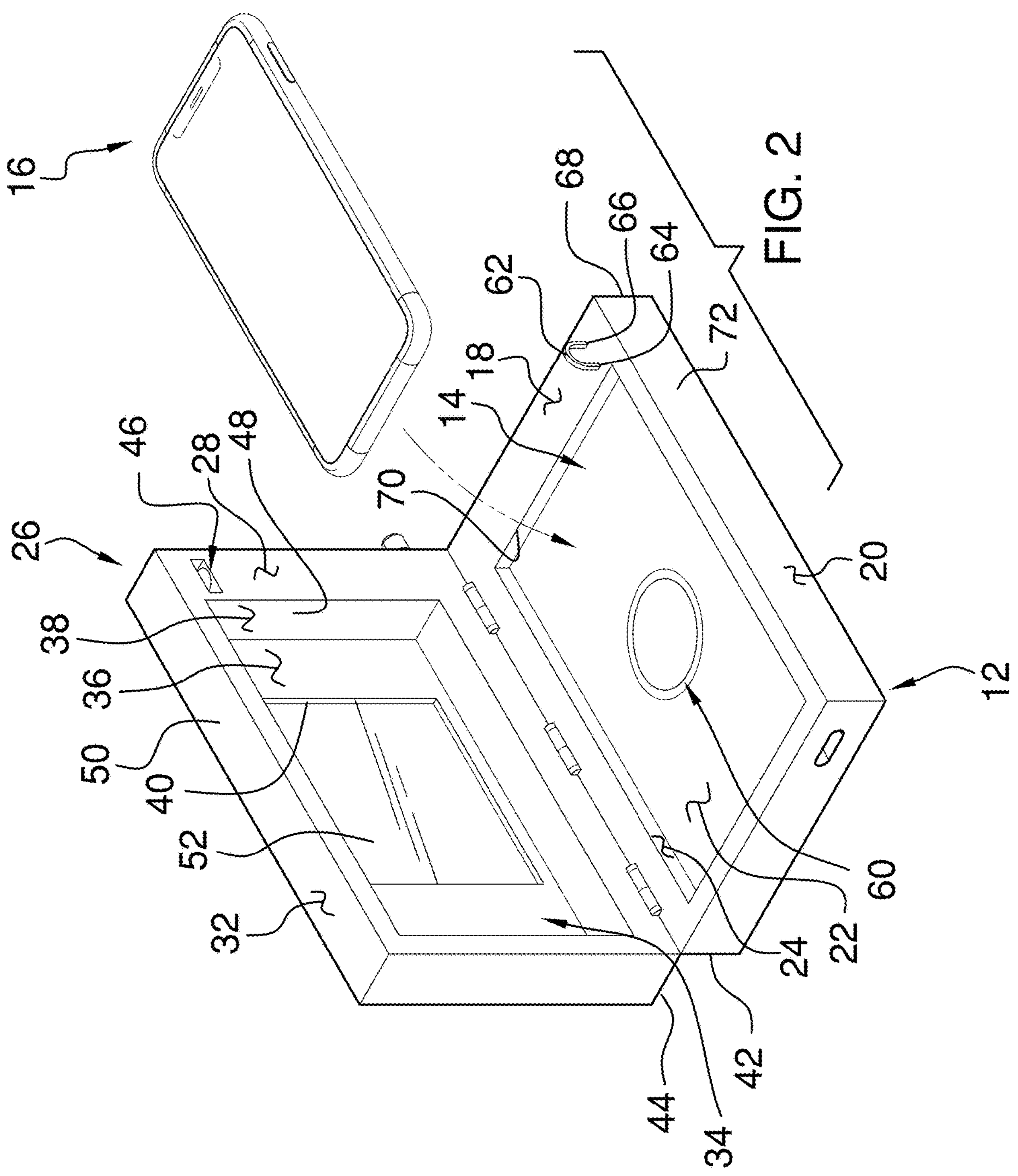
FIG. 2 is a perspective view of an embodiment of the disclosure showing a lid in an open position exposing a recess in a block.
Figure 3:
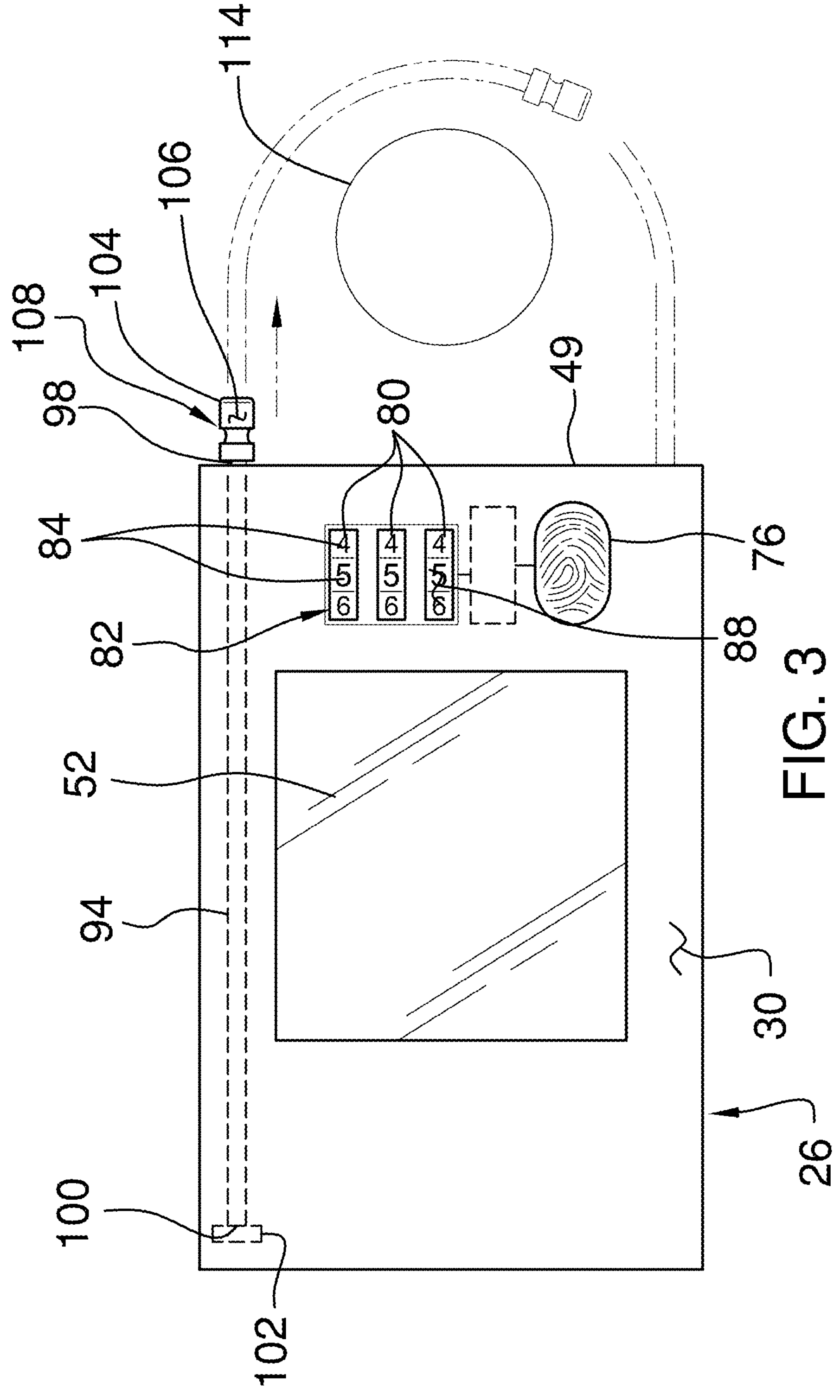
FIG. 3 is a top phantom view of an embodiment of the disclosure.
Figure 4:
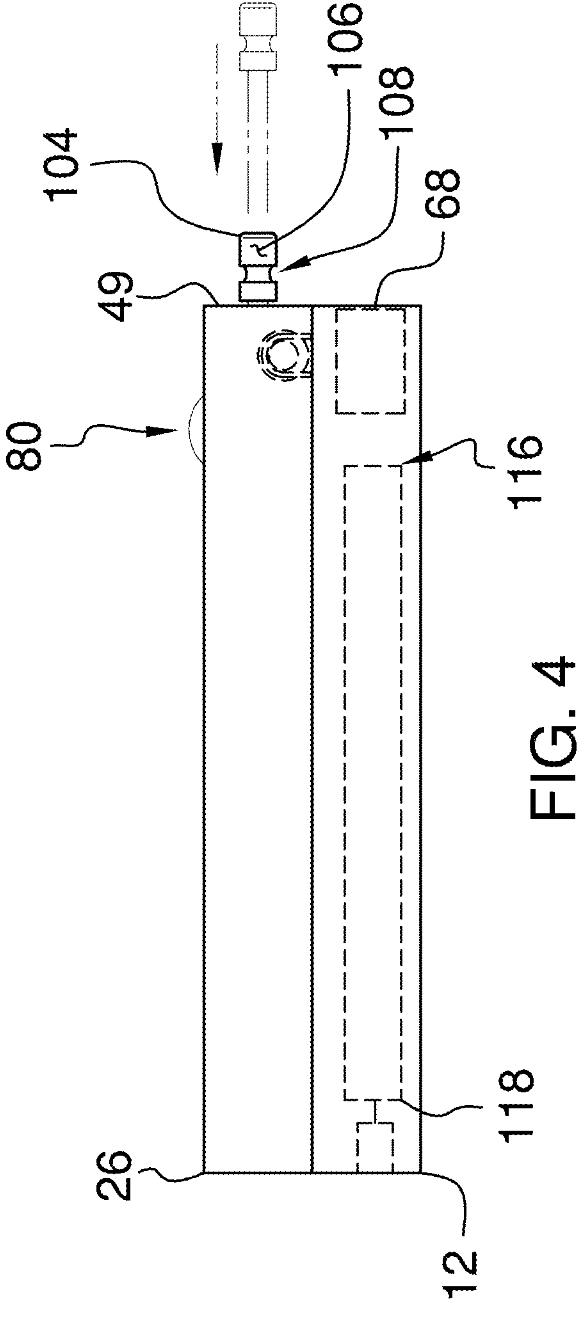
FIG. 4 is a right side phantom view of an embodiment of the disclosure.
Figure 5:
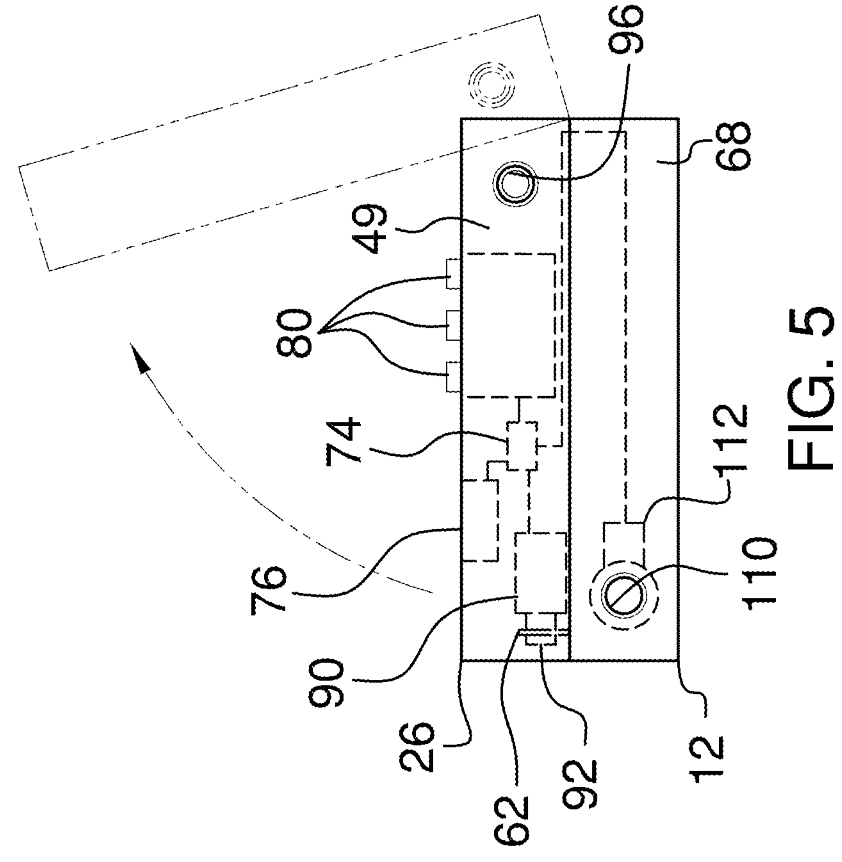
FIG. 5 is a front phantom view of an embodiment of the disclosure.
Figure 6:
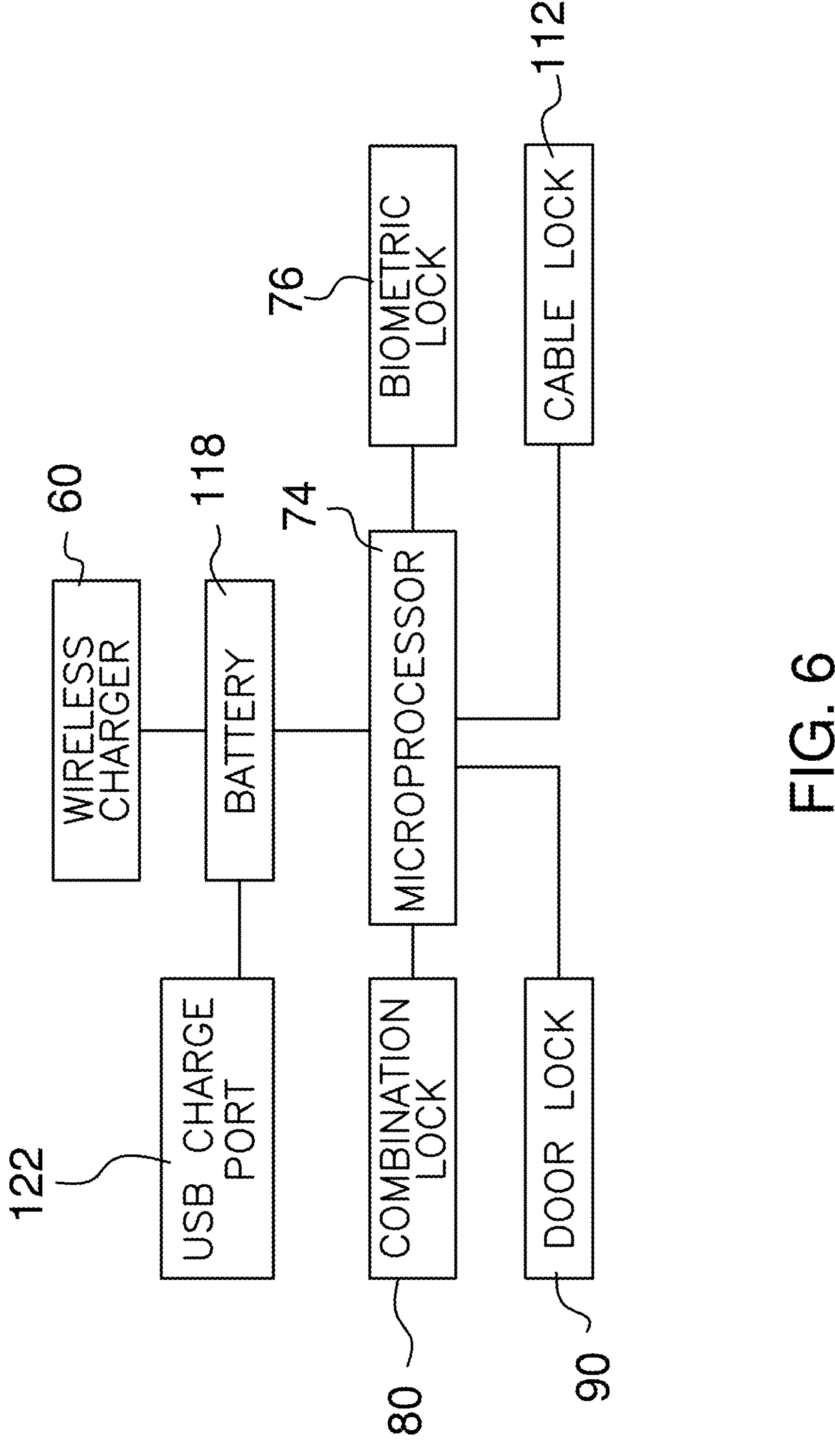
FIG. 6 is a schematic view of an embodiment of the disclosure.

With reference now to the drawings, and in particular to FIGS. 1 through 6 thereof, a new smartphone lock device embodying the principles and concepts of an embodiment of the disclosure and generally designated by the reference numeral 10 will be described.

As best illustrated in FIGS. 1 through 6, the smartphone secure storage device generally comprises a block 12 that has a recess 14 extending into the block 12 to contain a smartphone 16. The block 12 has a top surface 18 and a perimeter surface 20 and the recess 14 extends into the top surface 18. The recess 14 has a lower bounding surface 22 and the smartphone 16 rests upon the lower bounding surface 22. The recess 14 has a lateral bounding surface 24 and the lateral bounding surface 24 is spaced from the perimeter surface 20. The block 12 is comprised of rigid material, including but not being limited to metal or high impact plastic, to protect the smartphone 16 from impact damage and to inhibit the block 12 from being deformed or damaged by impact.

A lid 26 is provided and the lid 26 is hingedly coupled to the block 12. The lid 26 is positionable in a closed position to close the recess 14 thereby securing the smartphone 16 in the recess 14. The lid 26 is positionable in an open position to expose the recess 14 to have the smartphone 16 be removed from or positioned in the recess 14. The lid 26 is comprised of rigid material, including but not being limited to metal or high impact plastic, to protect the smartphone 16 from impact damage and to inhibit the lid 26 from being deformed or damaged by impact.

The lid 26 has a lower surface 28 and an upper surface 30 and an exterior surface 32 extending between the lower surface 28 and the upper surface 30. The lower surface 28 has a recess 34 in the lower surface 28 extending toward the upper surface 30. The recess 34 in the lower surface 28 has an upper bounding surface 36 and a perimeter bounding surface 38; the perimeter bounding surface 38 is spaced from the exterior surface 32. Furthermore, the recess 14 in the lower bounding surface 22 is aligned with the recess 14 in the top surface 18 of the block 12 when the lid 26 is in the closed position. Subsequently, the recess 34 in the lower surface 28 of the lid 26 and the recess 14 in the top surface 18 of the block 12 contain the smartphone 16.

The lid 26 has an opening 40 extending through the upper surface 30 of the lid 26 and the upper bounding surface 36 of the recess 34 in the lower surface 28 of the lid 26; the smartphone 16 is visible through the opening 40. The perimeter surface 20 of the block 12 has a first lateral side 42 and the exterior surface 32 of the lid 26 has a first lateral side 44 of the exterior surface 32. An intersection of the first lateral side 44 of the exterior surface 32 of the lid 26 and the lower surface 28 of the lid 26 is hingedly coupled to an intersection of the first lateral side 42 of perimeter surface 20 of the block 12 and the top surface 18 of the block 12.

The lid 26 has a hoop well 46 extending into the lower surface 28 of the lid 26. The perimeter bounding surface 38 of the recess 34 in the lower surface 28 of the lid 26 has a forward side 48 and the exterior surface 32 of the lid 26 has a forward side 49 of the exterior surface 32. The hoop well 46 is positioned between the forward side 48 of the perimeter bounding surface 38 of the recess 34 in the lower surface 28 of the lid 26 and the forward side 49 of the exterior surface 32 of the lid 26. The exterior surface 32 of the lid 26 has a second lateral side 50 and the hoop well 46 is elongated along a line which is oriented parallel to the second lateral side 50 of the exterior surface 32 of the lid 26. Furthermore, the hoop well 46 is positioned closer to the second lateral side 50 of the exterior surface 32 of the lid 26 than the first lateral side 44 of the exterior surface 32 of the lid 26.

A window 52 is provided and the window 52 is integrated into the lid 26. The window 52 is comprised of a translucent material, including but not being limited to glass or plastic, to pass light through the window 52 having the smartphone 16 being visible through the window 52 such that a user 54 can read notifications displayed on the smartphone 16 when the smartphone 16 is secured in recess 14 in the block 12. Additionally, the translucent material of which the window 52 is comprised may be comprised of a shatter resistant material to inhibit the window 52 from being broken to access the smartphone 16. The window 52 has a perimeter edge 56 and the opening 40 in the lid 26 has a bounding surface 58 of the opening 40. The perimeter edge 56 of the window 52 is coupled to the bounding surface 58 of the opening 40. Additionally, the window 52 completely covers the opening 40 to inhibit the smartphone 16 from being removed through the opening 40 when the lid 26 is in the closed position.

A wireless charger 60 is integrated into recess 14 in the block 12 and the wireless charger 60 is in wireless communication with the smartphone 16 when the smartphone 16 is positioned in the recess 14 in the block 12 for charging the smartphone 16. The wireless charger 60 is integrated into the lower bounding surface 22 of the recess 14 in the top surface 18 of the block 12. Furthermore, the smartphone 16 lies upon the wireless charger 60 when the smartphone 16 is positioned in the recess 14 in the top surface 18 of the block 12. The wireless charger 60 may be a wireless smartphone wireless charger of any conventional design that is commonly employed to wirelessly charge smartphones or other similar electronic devices.

A hoop 62 is coupled to and extends upwardly from the block 12 and the hoop 62 is offset from the recess 14 in the block 12. The hoop 62 has a first end 64 and a second end 66 and the hoop 62 is curved between the first end 64 and the second end 66; the first end 64 is spaced from and is aligned with the second end 66. Each of the first end 64 and the second end 66 is coupled to the top surface 18 of the block 12 having the hoop 62 curving upwardly from the top surface 18. The perimeter surface 20 of the block 12 has a front side 68 and the lateral bounding surface 24 of the recess 14 in the top surface 18 of the block 12 has a forward side 70. The hoop 62 is positioned between the front side 68 of the perimeter surface 20 of the block 12 and the forward side 70 of the lateral bounding surface 24 of the recess 14 in the top surface 18 of the block 12. The perimeter surface 20 of the block 12 has a second lateral side 72 and the hoop 62 is oriented such that a line extending between the first end 64 of the hoop 62 and the second end 66 of the hoop 62 is oriented parallel to the second lateral side 72 of the perimeter surface 20 of the block 12. Furthermore, the hoop 62 is positioned closer to the second lateral side 72 of the perimeter surface 20 of the block 12 than the first lateral side 42 of the perimeter surface 20 of the block 12. The hoop 62 extends into the hoop well 46 in the lower surface 28 of the lid 26 when the lid 26 is positioned in the closed position.

A processor 74 is integrated into the lid 26 and the processor 74 receives a lock input and an unlock input. A biometric scanner 76 is integrated into the lid 26 and the biometric scanner 76 can be touched by a finger 78 of the user 54 such that the biometric scanner 76 can read a fingerprint of the user 54. The biometric scanner 76 is in electrical communication with the processor 74 and the processor 74 receives the lock input when the biometric scanner 76 is actuated an initial time. Furthermore, the processor 74 receives the unlock input when the biometric scanner 76 is actuated a subsequent time. The biometric scanner 76 is recessed into the upper surface 30 of the lid 26 and the biometric scanner 76 is positioned between the window 52 and the forward side 49 of the exterior surface 32 of the lid 26. Additionally, the biometric scanner 76 is positioned closer to the second lateral side 50 of the exterior surface 32 of the lid 26 than the first lateral side 44 of the exterior surface 32 of the lid 26. The biometric scanner 76 may comprise an electronic fingerprint reader of any conventional design.

A plurality of wheels 80 is each rotatably integrated into the lid 26 and each wheel 80 of the plurality of wheels 80 can be rotated by the user 54. Each wheel 80 of the plurality of wheels 80 has numeral indicia 82 and the numeral indicia 82 on each wheel 80 of the plurality of wheels 80 comprise numbers 84 ranging between zero and nine. The plurality of wheels 80 is in electrical communication with the processor 74 and the processor 74 receives the unlock input when each wheel 80 of the plurality of wheels 80 is rotated to display a respective number 84 of the numeral indicia 82. The upper surface 30 of the lid 26 has a plurality of wheel wells 86 each extending into the upper surface 30. Each wheel well 86 of the plurality of wheel wells 86 is positioned between the opening 40 in the upper surface 30 of the lid 26 and the forward side 49 of the exterior surface 32 of the lid 26. Additionally, the plurality of wheel wells 86 is elongated to extend a partial distance between the opening 40 in the upper surface 30 of the lid 26 and the forward side 49 of the exterior surface 32 of the lid 26.

The plurality of wheel wells 86 is positioned between the biometric scanner 76 and the first lateral side 44 of the exterior surface 32 of the lid 26. Additionally, each wheel 80 of the plurality of wheels 80 has a rotating surface 88 and each wheel 80 of the plurality of wheels 80 is located in a respective wheel well 86. Each wheel 80 of the plurality of wheels 80 extends partially upwardly from the respective wheel well 86. Furthermore, the rotating surface 88 of each wheel 80 of the plurality of wheels 80 is accessible to the user 54. The numeral indicia 82 on each wheel 80 of the plurality of wheels 80 is applied to the rotating surface 88.

A locking mechanism 90 is integrated into the lid 26 and the locking mechanism 90 is in electrical communication with the processor 74. The locking mechanism 90 is actuated into a locking condition when the processor 74 receives the lock input. The locking mechanism 90 extends through the hoop 62 on the block 12 when the locking mechanism 90 is actuated into the locking condition. The lid 26 is inhibited from being positioned in the open position when the locking mechanism 90 extends through the hoop 62. Furthermore, the locking mechanism 90 inhibits an unauthorized person from accessing the smartphone 16. The locking mechanism 90 is actuated into an unlocking condition when the processor 74 receives the unlock input. Additionally, the locking mechanism 90 is displaced from the hoop 62 when the locking mechanism 90 is actuated into the unlocking condition such that the user 54 can position the lid 26 into the open position.

The locking mechanism 90 is aligned with the hoop well 46 in the lower surface 28 of the lid 26. The locking mechanism 90 has a plunger 92 which extends across the hoop well 46 when the locking mechanism 90 is actuated into the locking condition. Additionally, the plunger 92 extends through the hoop 62 when the locking mechanism 90 is actuated into the locking condition. Conversely, the plunger 92 is retracted from the hoop well 46 when the locking mechanism 90 is actuated into the unlocking condition. Subsequently, the plunger 92 is retracted from the hoop 62 when the locking mechanism 90 is actuated into the unlocking condition. The locking mechanism 90 may comprise an electromechanical lock or the like that is capable of producing a linear motion of the plunger 92.

A cable 94 is provided and the cable 94 is slidably integrated into the lid 26. The cable 94 is extendable outwardly from the lid 26 and the cable 94 is retractable into the lid 26. The lid 26 has a cable well 96 extending into the forward side 49 of the exterior surface 32 of the lid 26 and the cable well 96 is located adjacent to the first lateral side 44 of the exterior surface 32 of the lid 26. The cable well 96 is elongated to extend along a partial length of the first lateral side 44 of the exterior surface 32 of the lid 26 and the cable 94 is slidably disposed in the cable well 96.

The cable 94 has a front end 98 and a rear end 100 and a stop 102 is coupled to the rear end 100. The stop 102 inhibits the cable 94 from being removed from the cable well 96 when the cable 94 is extended outwardly from the cable well 96. A cylinder 104 is coupled to the front end 98 of the cable 94 and the cylinder 104 has an outside surface 106. The cylinder 104 has a groove 108 extending into the outside surface 106 and the groove 108 extends around a full circumference of the outside surface 106. The block 12 has a lock well 110 extending into the front side 68 of the perimeter surface 20 of the block 12 and the lock well 110 is positioned adjacent to the second lateral side 72 of the perimeter surface 20 of the block 12. Additionally, the cylinder 104 on the front end 98 of the cable 94 is insertable into the lock well 110.

A cable lock 112 is integrated into the block 12 and the cable 94 is insertable into the cable lock 112 when the cable 94 is extended outwardly from the lid 26. The cable 94 forms a closed loop when the cable 94 is inserted into the cable lock 112. Furthermore, the closed loop formed by the cable 94 can be extended around a stationary object 114 to secure the block 12 and the lid 26 to the stationary object 114. The cable lock 112 is aligned with the lock well 110 and the cable lock 112 is in electrical communication with the processor 74. The cable lock 112 is actuated into a locking condition when the processor 74 receives the lock input and the cable lock 112 is actuated into an unlocking condition when the processor 74 receives the unlock input.

The cable lock 112 engages the groove 108 in the outside surface 106 of the cylinder 104 on the front end 98 of the cable 94 when the cylinder 104 is inserted into the lock well 110 and the cable lock 112 is actuated into the locking condition. Additionally, the cylinder 104 is inhibited from being removed from the lock well 110 when the cable lock 112 engages the groove 108 in the outside surface 106 of the cylinder 104. The cylinder 104 is removable from the lock well 110 when the cable lock 112 disengages the groove 108 in the outside surface 106 of the cylinder 104. The cable lock 112 may comprise an electromechanical lock or the like which can engage and disengage the groove 108 in the outside surface 106 of the cylinder 104.

A power supply 116 is integrated into the block 12 and the power supply 116 is in electrical communication with the processor 74. The power supply 116 is in electrical communication with the wireless charger 60. The power supply 116 comprises a rechargeable battery 118 which is integrated into the block 12 and the rechargeable battery 118 is in electrical communication with the processor 74. The perimeter surface of the block 12 has a back side 120 and a charge port 122 is recessed into the back side 120 of the perimeter surface 20 of the block 12. Additionally, the charge port 122 can insertably receive a charge cord 124. The charge port 122 is in electrical communication with the rechargeable battery 118 for charging the rechargeable battery 118 and the charge port 122 is in electrical communication with the wireless charger 60 to supply operational electrical energy to the wireless charger 60. The charge port 122 may comprise a type C charge port or other type of charge port commonly associated with rechargeable electronic devices and the charge cord 124 may comprise a type C charge cord or other type of charge cord commonly associated with rechargeable electronic devices.

In use, the smartphone 16 is placed in the recess 14 in the top surface 18 of the block 12 and the lid 26 is positioned in the closed position. The user 54 places their finger 78 on the biometric scanner 76 to acuate the locking mechanism 90 into the locking condition to lock the lid 26 in the closed position. Furthermore, the smartphone 16 is secured such that the smartphone 16 is inaccessible to anyone other than the user 54. The cable 94 can be extended from the cable well 96 and extended around the stationary object 114 and inserted into the cable lock 112 to secure the block 12 and the lid 26 to the stationary object 114. The user 54 can either touch the biometric scanner 76 or the user 54 can rotate the plurality of wheels 80 to expose the numeral indicia 82 on the wheels 80 in a specific sequence of numbers to actuate the locking mechanism 90 into the unlocking condition. The smartphone 16 can be charged while the smartphone 16 is secured in the block 12 and any notifications displayed on the smartphone 16 can be viewed through the window 52 while the smartphone 16 is secured in the block 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A smartphone secure storage device for securely storing a smartphone, said device comprising:

a block having a recess extending into said block wherein said recess is configured to contain a smartphone;

a lid being hingedly coupled to said block, said lid being positionable in a closed position to close said recess wherein said lid is configured to secure the smartphone in said recess, said lid being positionable in an open position to expose said recess wherein said lid is configured to have the smartphone be removed from or positioned in said recess;

a window being integrated into said lid, said window being comprised of a translucent material wherein said window is configured to pass light through said window having the smartphone being visible through said window such that a user can read notifications displayed on the smartphone when the smartphone is secured in recess in said block;

a wireless charger being integrated into recess in said block wherein said wireless charger is configured to be in wireless communication with the smartphone when the smartphone is positioned in said recess in said block for charging the smartphone;

a hoop being coupled to and extending upwardly from said block, said hoop being offset from said recess in said block;

a processor being integrated into said lid, said processor receiving a lock input, said processor receiving an unlock input;

a biometric scanner being integrated into said lid wherein said biometric scanner is configured to be touched by a finger of the user such that said biometric scanner can read a fingerprint of the user, said biometric scanner being in electrical communication with said processor, said processor receiving said lock input when said biometric scanner is actuated an initial time, said processor receiving said unlock input when said biometric scanner is actuated a subsequent time;

a locking mechanism being integrated into said lid, said locking mechanism being in electrical communication with said processor, said locking mechanism being actuated into a locking condition when said processor receives said lock input, said locking mechanism extending through said hoop on said block when said locking mechanism is actuated into said locking condition, said lid being inhibited from being positioned in said open position when said locking mechanism extends through said hoop wherein said locking mechanism is configured to inhibit an unauthorized person from accessing the smartphone, said locking mechanism being actuated into an unlocking condition when said processor receives said unlock input, said locking mechanism being displaced from said hoop when said locking mechanism is actuated into said unlocking condition wherein said locking mechanism is configured to have the user position said lid into said open position;

a cable being slidably integrated into said lid, said cable being extendable outwardly from said lid, said cable being retractable into said lid; and a cable lock being integrated into said block, said cable being insertable into said cable lock when said cable is extended outwardly from said lid, said cable forming a closed loop when said cable is inserted into said cable lock wherein said closed loop formed by said cable is configured to be extended around a stationary object to secure said block and said lid to the stationary object.

2. The smartphone secure storage device according to claim 1, further comprising:

said block having a top surface and a perimeter surface;

said recess extending into said top surface;

said recess having a lower bounding surface wherein said lower bounding surface is configured to have the smartphone rest upon said lower bounding surface;

said recess having a lateral bounding surface;

said lateral bounding surface being spaced from said perimeter surface;

said lid having a lower surface and an upper surface and an exterior surface extending between said lower surface and said upper surface;

said perimeter surface of said block having a first lateral side;

said exterior surface of said lid having a first lateral side of said exterior surface; and an intersection of said first lateral side of said exterior surface of said lid and said lower surface of said lid being hingedly coupled to an intersection of said first lateral side of perimeter surface of said block and said top surface of said block.

3. The smartphone secure storage device according to claim 2, further comprising:

said lower surface of said lid having a recess in said lower surface extending toward said upper surface;

said recess in said lower surface having an upper bounding surface and a perimeter bounding surface;

said perimeter bounding surface being spaced from said exterior surface;

said recess in said lower bounding surface being aligned with said recess in said top surface of said block when said lid is in said closed position wherein said recess in said lower surface of said lid and said recess in said top surface of said block are configured to contain the smartphone.

4. The smartphone secure storage device according to claim 3, further comprising:

said lid having an opening extending through said upper surface of said lid and said upper bounding surface of said recess in said lower surface of said lid wherein said opening is configured to have the smartphone be visible through said opening;

said window having a perimeter edge;

said opening in said lid having a bounding surface of said opening;

said perimeter edge of said window being coupled to said bounding surface of said opening; and said window completely covering said opening wherein said window is configured to inhibit the smartphone from being removed through said opening when said lid is in said closed position.

5. The smartphone secure storage device according to claim 3, further comprising:

said lid having a hoop well extending into said lower surface of said lid;

said perimeter bounding surface of said recess in said lower surface of said lid having a forward side;

said exterior surface of said lid having a forward side of said exterior surface;

said hoop well being positioned between said forward side of said perimeter bounding surface of said recess in said lower surface of said lid and said forward side of said exterior surface of said lid;

said exterior surface of said lid having a second lateral side;

said hoop well being elongated along a line being oriented parallel to said second lateral side of said exterior surface of said lid; and said hoop well being positioned closer to said second lateral side of said exterior surface of said lid than said first lateral side of said exterior surface of said lid.

6. The smartphone secure storage device according to claim 5, further comprising:

said hoop having a first end and a second end;

said hoop being curved between said first end and said second end;

said first end being spaced from and being aligned with said second end;

each of said first end and said second end being coupled to said top surface of said block having said hoop curving upwardly from said top surface;

said perimeter surface of said block having a front side;

said lateral bounding surface of said recess in said top surface of said block having a forward side;

said hoop being positioned between said front side of said perimeter surface of said block and said forward side of said lateral bounding surface of said recess in said top surface of said block;

said perimeter surface of said block having a second lateral side;

said hoop being oriented such that a line extending between said first end of said hoop and said second end of said hoop is oriented parallel to said second lateral side of said perimeter surface of said block;

said hoop being positioned closer to said second lateral side of said perimeter surface of said block than said first lateral side of said perimeter surface of said block; and said hoop extending into said hoop well in said lower surface of said lid when said lid is positioned in said closed position.

7. The smartphone secure storage device according to claim 5, further comprising:

said locking mechanism being aligned with said hoop well in said lower surface of said lid;

said locking mechanism having a plunger which extends across said hoop well when said locking mechanism is actuated into said locking condition;

said plunger extending through said hoop when said locking mechanism is actuated into said locking condition;

said plunger being retracted from said hoop well when said locking mechanism is actuated into said unlocking condition; and said plunger being retracted from said hoop when said locking mechanism is actuated into said unlocking condition.

8. The smartphone secure storage device according to claim 2, further comprising:

said exterior surface of said lid having a forward side of said exterior surface of said lid;

said exterior surface of said lid having a second lateral side of said exterior surface of said lid;

said biometric scanner being recessed into said upper surface of said lid;

said biometric scanner being positioned between said window and said forward side of said exterior surface of said lid;

said biometric scanner being positioned closer to said second lateral side of said exterior surface of said lid than said first lateral side of said exterior surface of said lid.

9. The smartphone secure storage device according to claim 2, further comprising:

said lid having a cable well extending into said forward side of said exterior surface of said lid;

said cable well being located adjacent to said first lateral side of said exterior surface of said lid;

said cable well being elongated to extend along a partial length of said first lateral side of said exterior surface of said lid.

10. The smartphone secure storage device according to claim 9, further comprising:

said cable being slidably disposed in said cable well;

said cable having a front end and a rear end;

said cable having a stop being coupled to said rear end; and said stop inhibiting said cable from being removed from said cable well when said cable is extended outwardly from said cable well.

11. The smartphone secure storage device according to claim 10, further comprising:

said cable having a cylinder being coupled to said front end of said cable;

said cylinder having an outside surface;

said cylinder having a groove extending into said outside surface; and said groove extending around a full circumference of said outside surface.

12. The smartphone secure storage device according to claim 11, further comprising:

said perimeter surface of said block having a front side and a first lateral side and a second lateral side;

said block having a lock well extending into said front side of said perimeter surface of said block;

said lock well being positioned adjacent to said second lateral side of said perimeter surface of said block; and said cylinder on said front end of said cable being insertable into said lock well.

13. The smartphone secure storage device according to claim 12, further comprising:

said cable lock being aligned with said lock well;

said cable lock being in electrical communication with said processor;

said cable lock being actuated into a locking condition when said processor receives said lock input; and said cable lock being actuated into an unlocking condition when said processor receives said unlock input.

14. The smartphone secure storage device according to claim 11, further comprising:

said cable lock engaging said groove in said outside surface of said cylinder on said front end of said cable when said cylinder is inserted into said lock well and said cable lock is actuated into said locking condition;

said cylinder being inhibited from being removed from said lock well when said cable lock engages said groove in said outside surface of said cylinder; and said cylinder being removable from said lock well when said cable lock disengages said groove in said outside surface of said cylinder.

15. The smartphone secure storage device according to claim 1, further comprising:

a plurality of wheels;

each wheel of said plurality of wheels being rotatably integrated into said lid wherein each wheel of said plurality of wheels is configured to be rotated by the user;

each wheel of said plurality of wheels having numeral indicia;

said numeral indicia on each wheel of said plurality of wheels comprising numbers ranging between zero and nine; and said plurality of wheels being in electrical communication with said processor;

said processor receiving said unlock input when each wheel of said plurality of wheels is rotated to display a respective number of said numeral indicia.

16. The smartphone secure storage device according to claim 15, further comprising:

said lid having an upper surface and an exterior surface;

said exterior surface having a forward side and a first lateral side;

said upper surface of said lid having a plurality of wheel wells each extending into said upper surface;

each wheel well of said plurality of wheel wells being positioned between said opening in said upper surface of said lid and said forward side of said exterior surface of said lid;

said plurality of wheel wells being elongated to extend a partial distance between said opening in said upper surface of said lid and said forward side of said exterior surface of said lid;

said plurality of wheel wells being positioned between said biometric scanner and said first lateral side of said exterior surface of said lid;

each wheel of said plurality of wheels having a rotating surface;

each wheel of said plurality of wheels being located in a respective wheel well;

each wheel of said plurality of wheels extending partially upwardly from said respective wheel well wherein said rotating surface of each wheel of said plurality of wheels is configured to be accessible to the user; and said numeral indicia on each wheel of said plurality of wheels being applied to said rotating surface.

17. The smartphone secure storage device according to claim 1, further comprising:

said block having a perimeter surface;

said perimeter surface of said block having a back side, a power supply being integrated into said block;

said power supply being in electrical communication with said processor;

said power supply being in electrical communication with said wireless charger; and said power supply comprising:

a rechargeable battery being integrated into said block, said rechargeable battery being in electrical communication with said processor; and a charge port being recessed into said back side of said perimeter surface of said block wherein said charge port is configured to insertably receive a charge cord, said charge port being in electrical communication with said rechargeable battery for charging said rechargeable battery, said charge port being in electrical communication with said wireless charger to supply operational electrical energy to said wireless charger.

18. A smartphone secure storage device for securely storing a smartphone, said device comprising:

a block having a recess extending into said block wherein said recess is configured to contain a smartphone, said block having a top surface and a perimeter surface, said recess extending into said top surface, said recess having a lower bounding surface wherein said lower bounding surface is configured to have the smartphone rest upon said lower bounding surface, said recess having a lateral bounding surface, said lateral bounding surface being spaced from said perimeter surface;

a lid being hingedly coupled to said block, said lid being positionable in a closed position to close said recess wherein said lid is configured to secure the smartphone in said recess, said lid being positionable in an open position to expose said recess wherein said lid is configured to have the smartphone be removed from or positioned in said recess, said lid having a lower surface and an upper surface and an exterior surface extending between said lower surface and said upper surface, said lower surface having a recess in said lower surface extending toward said upper surface, said recess in said lower surface having an upper bounding surface and a perimeter bounding surface, said perimeter bounding surface being spaced from said exterior surface, said recess in said lower bounding surface being aligned with said recess in said top surface of said block when said lid is in said closed position wherein said recess in said lower surface of said lid and said recess in said top surface of said block are configured to contain the smartphone, said lid having an opening extending through said upper surface of said lid and said upper bounding surface of said recess in said lower surface of said lid wherein said opening is configured to have the smartphone be visible through said opening, said perimeter surface of said block having a first lateral side, said exterior surface of said lid having a first lateral side of said exterior surface, an intersection of said first lateral side of said exterior surface of said lid and said lower surface of said lid being hingedly coupled to an intersection of said first lateral side of perimeter surface of said block and said top surface of said block, said lid having a hoop well extending into said lower surface of said lid, said perimeter bounding surface of said recess in said lower surface of said lid having a forward side, said exterior surface of said lid having a forward side of said exterior surface, said hoop well being positioned between said forward side of said perimeter bounding surface of said recess in said lower surface of said lid and said forward side of said exterior surface of said lid, said exterior surface of said lid having a second lateral side, said hoop well being elongated along a line being oriented parallel to said second lateral side of said exterior surface of said lid, said hoop well being positioned closer to said second lateral side of said exterior surface of said lid than said first lateral side of said exterior surface of said lid;

a window being integrated into said lid, said window being comprised of a translucent material wherein said window is configured to pass light through said window having the smartphone being visible through said window such that a user can read notifications displayed on the smartphone when the smartphone is secured in recess in said block, said window having a perimeter edge, said opening in said lid having a bounding surface of said opening, said perimeter edge of said window being coupled to said bounding surface of said opening, said window completely covering said opening wherein said window is configured to inhibit the smartphone from being removed through said opening when said lid is in said closed position;

a wireless charger being integrated into recess in said block wherein said wireless charger is configured to be in wireless communication with the smartphone when the smartphone is positioned in said recess in said block for charging the smartphone, said wireless charger being integrated into said lower bounding surface of said recess in said top surface of said block wherein said wireless charger is configured to have the smartphone lie upon said wireless charger when the smartphone is positioned in said recess in said top surface of said block;

a hoop being coupled to and extending upwardly from said block, said hoop being offset from said recess in said block, said hoop having a first end and a second end, said hoop being curved between said first end and said second end, said first end being spaced from and being aligned with said second end, each of said first end and said second end being coupled to said top surface of said block having said hoop curving upwardly from said top surface, said perimeter surface of said block having a front side, said lateral bounding surface of said recess in said top surface of said block having a forward side, said hoop being positioned between said front side of said perimeter surface of said block and said forward side of said lateral bounding surface of said recess in said top surface of said block, said perimeter surface of said block having a second lateral side, said hoop being oriented such that a line extending between said first end of said hoop and said second end of said hoop is oriented parallel to said second lateral side of said perimeter surface of said block, said hoop being positioned closer to said second lateral side of said perimeter surface of said block than said first lateral side of said perimeter surface of said block, said hoop extending into said hoop well in said lower surface of said lid when said lid is positioned in said closed position;

a processor being integrated into said lid, said processor receiving a lock input, said processor receiving an unlock input;

a biometric scanner being integrated into said lid wherein said biometric scanner is configured to be touched by a finger of the user such that said biometric scanner can read a fingerprint of the user, said biometric scanner being in electrical communication with said processor, said processor receiving said lock input when said biometric scanner is actuated an initial time, said processor receiving said unlock input when said biometric scanner is actuated a subsequent time, said biometric scanner being recessed into said upper surface of said lid, said biometric scanner being positioned between said window and said forward side of said exterior surface of said lid, said biometric scanner being positioned closer to said second lateral side of said exterior surface of said lid than said first lateral side of said exterior surface of said lid;

a plurality of wheels, each wheel of said plurality of wheels being rotatably integrated into said lid wherein each wheel of said plurality of wheels is configured to be rotated by the user, each wheel of said plurality of wheels having numeral indicia, said numeral indicia on each wheel of said plurality of wheels comprising numbers ranging between zero and nine, said plurality of wheels being in electrical communication with said processor, said processor receiving said unlock input when each wheel of said plurality of wheels is rotated to display a respective number of said numeral indicia, said upper surface of said lid having a plurality of wheel wells each extending into said upper surface, each wheel well of said plurality of wheel wells being positioned between said opening in said upper surface of said lid and said forward side of said exterior surface of said lid, said plurality of wheel wells being elongated to extend a partial distance between said opening in said upper surface of said lid and said forward side of said exterior surface of said lid, said plurality of wheel wells being positioned between said biometric scanner and said first lateral side of said exterior surface of said lid, each wheel of said plurality of wheels having a rotating surface, each wheel of said plurality of wheels being located in a respective wheel well, each wheel of said plurality of wheels extending partially upwardly from said respective wheel well wherein said rotating surface of each wheel of said plurality of wheels is configured to be accessible to the user, said numeral indicia on each wheel of said plurality of wheels being applied to said rotating surface;

a locking mechanism being integrated into said lid, said locking mechanism being in electrical communication with said processor, said locking mechanism being actuated into a locking condition when said processor receives said lock input, said locking mechanism extending through said hoop on said block when said locking mechanism is actuated into said locking condition, said lid being inhibited from being positioned in said open position when said locking mechanism extends through said hoop wherein said locking mechanism is configured to inhibit an unauthorized person from accessing the smartphone, said locking mechanism being actuated into an unlocking condition when said processor receives said unlock input, said locking mechanism being displaced from said hoop when said locking mechanism is actuated into said unlocking condition wherein said locking mechanism is configured to have the user position said lid into said open position, said locking mechanism being aligned with said hoop well in said lower surface of said lid, said locking mechanism having a plunger which extends across said hoop well when said locking mechanism is actuated into said locking condition, said plunger extending through said hoop when said locking mechanism is actuated into said locking condition, said plunger being retracted from said hoop well when said locking mechanism is actuated into said unlocking condition, said plunger being retracted from said hoop when said locking mechanism is actuated into said unlocking condition;

a cable being slidably integrated into said lid, said cable being extendable outwardly from said lid, said cable being retractable into said lid, said lid having a cable well extending into said forward side of said exterior surface of said lid, said cable well being located adjacent to said first lateral side of said exterior surface of said lid, said cable well being elongated to extend along a partial length of said first lateral side of said exterior surface of said lid, said cable being slidably disposed in said cable well, said cable having a front end and a rear end, said cable having a stop being coupled to said rear end, said stop inhibiting said cable from being removed from said cable well when said cable is extended outwardly from said cable well, said cable having a cylinder being coupled to said front end of said cable, said cylinder having an outside surface, said cylinder having a groove extending into said outside surface, said groove extending around a full circumference of said outside surface, said block having a lock well extending into said front side of said perimeter surface of said block, said lock well being positioned adjacent to said second lateral side of said perimeter surface of said block, said cylinder on said front end of said cable being insertable into said lock well;

a cable lock being integrated into said block, said cable being insertable into said cable lock when said cable is extended outwardly from said lid, said cable forming a closed loop when said cable is inserted into said cable lock wherein said closed loop formed by said cable is configured to be extended around a stationary object to secure said block and said lid to the stationary object, said cable lock being aligned with said lock well, said cable lock being in electrical communication with said processor, said cable lock being actuated into a locking condition when said processor receives said lock input, said cable lock being actuated into an unlocking condition when said processor receives said unlock input, said cable lock engaging said groove in said outside surface of said cylinder on said front end of said cable when said cylinder is inserted into said lock well and said cable lock is actuated into said locking condition, said cylinder being inhibited from being removed from said lock well when said cable lock engages said groove in said outside surface of said cylinder, said cylinder being removable from said lock well when said cable lock disengages said groove in said outside surface of said cylinder; and a power supply being integrated into said block, said power supply being in electrical communication with said processor, said power supply being in electrical communication with said wireless charger, said perimeter surface of said block having a back side, said power supply comprising:

a rechargeable battery being integrated into said block, said rechargeable battery being in electrical communication with said processor; and a charge port being recessed into said back side of said perimeter surface of said block wherein said charge port is configured to insertably receive a charge cord, said charge port being in electrical communication with said rechargeable battery for charging said rechargeable battery, said charge port being in electrical communication with said wireless charger to supply operational electrical energy to said wireless charger.

* * * * *